(12) United States Patent
Massieu et al.

(10) Patent No.: US 7,143,941 B2
(45) Date of Patent: Dec. 5, 2006

(54) OPTOELECTRONIC DEVICE AND PROCESS FOR ACQUIRING SYMBOLS, SUCH AS BAR CODES, USING A TWO-DIMENSIONAL SENSOR

(75) Inventors: Jean-Louis Massieu, Montauban (FR); Jean-Michel Puech, Toulouse (FR); Khalid El Akel, Castanet (FR)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 10/800,954

(22) Filed: Mar. 15, 2004

(65) Prior Publication Data

US 2004/0173682 A1 Sep. 9, 2004

Related U.S. Application Data

(63) Continuation of application No. 09/747,314, filed on Dec. 22, 2000, now Pat. No. 6,732,930.

(30) Foreign Application Priority Data

Dec. 23, 1999 (FR) .................................. 99 16421

(51) Int. Cl.
*G06K 7/14* (2006.01)
(52) U.S. Cl. ................................... 235/454
(58) Field of Classification Search ........... 235/462.01, 235/462.09, 462.11, 462.12, 462.25; 382/318, 382/199, 321; 250/206, 208.1
See application file for complete search history.

(56) References Cited

U.S. PATENT DOCUMENTS

| 5,153,418 | A | * | 10/1992 | Batterman et al. ........... 235/494 |
|---|---|---|---|---|
| 5,319,182 | A | | 6/1994 | Havens et al. ............... 235/462 |
| 5,354,977 | A | | 10/1994 | Roustaei ..................... 235/472 |
| 5,418,862 | A | * | 5/1995 | Zheng et al. ................ 382/199 |
| 5,446,271 | A | | 8/1995 | Cherry et al. ................ 235/462 |
| 5,635,699 | A | | 6/1997 | Cherry et al. ................ 235/462 |
| 5,654,533 | A | | 8/1997 | Suzuki et al. ................ 235/455 |
| 5,710,417 | A | | 1/1998 | Joseph et al. ................ 235/462 |
| 6,328,214 | B1 | | 12/2001 | Akel et al. ............. 235/462.27 |
| 6,512,218 | B1 | | 1/2003 | Canini et al. ............. 250/208.1 |

FOREIGN PATENT DOCUMENTS

| EP | 0061000 A1 | 9/1982 |
|---|---|---|
| EP | 0315515 A1 | 5/1989 |
| WO | WO96/20454 | 7/1996 |
| WO | WO98/16896 | 4/1998 |
| WO | WO98/47377 | 10/1998 |
| WO | WO99/48281 | 9/1999 |

* cited by examiner

*Primary Examiner*—Thien M. Le
*Assistant Examiner*—Jamara A. Franklin
(74) *Attorney, Agent, or Firm*—Seed IP Law Group PLLC

(57) ABSTRACT

The invention relates to a device and a process for acquiring bichromatic bar codes, with a two-dimensional sensor with electronic scanning. The height Hy of the scanned portion is modified between at least two successive scanning operations. Thus, the device is or may be adapted to the type and/or to characteristics not known in advance of the code to be read.

11 Claims, 5 Drawing Sheets

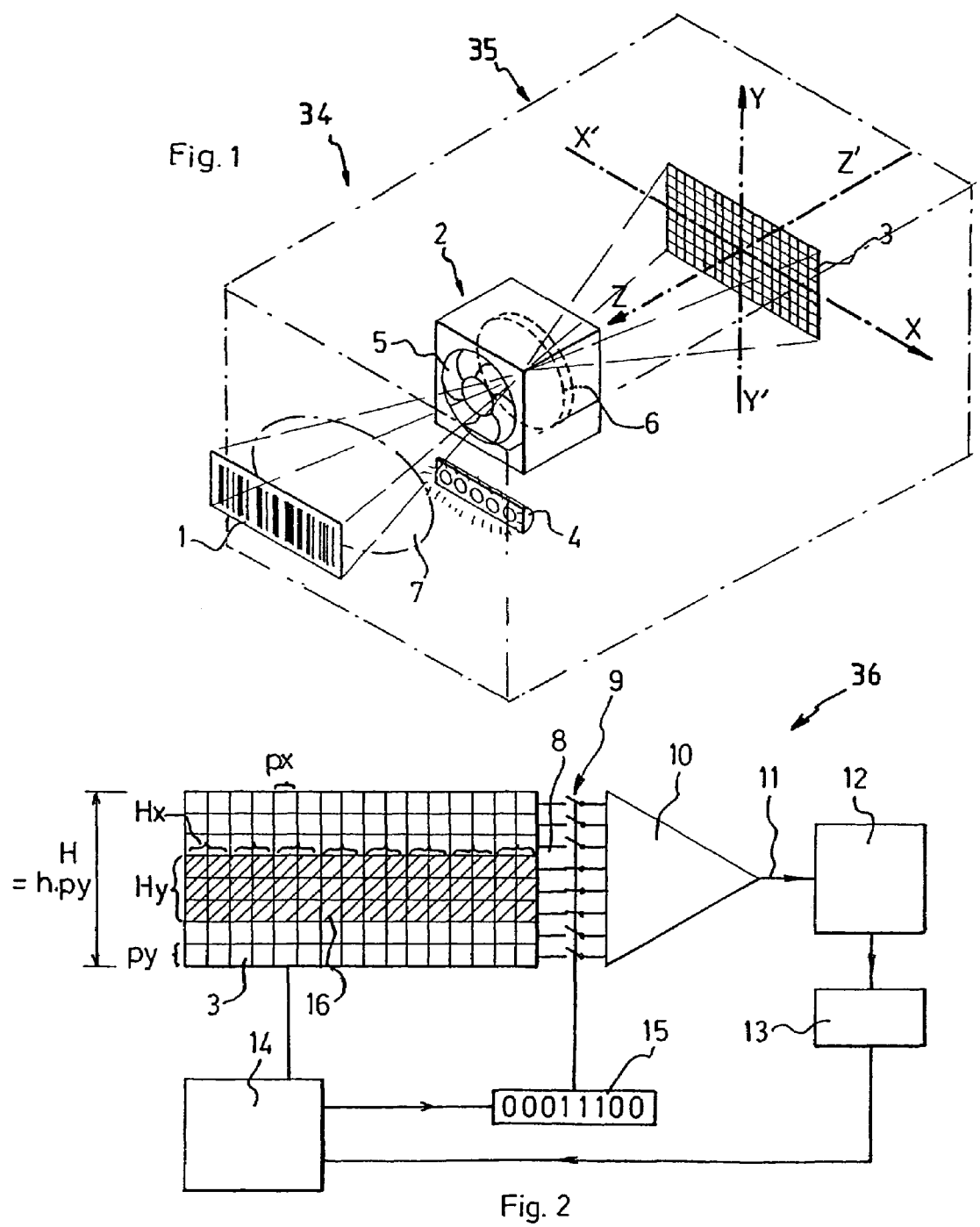

OPTOELECTRONIC DEVICE AND PROCESS FOR ACQUIRING SYMBOLS, SUCH AS BAR CODES, USING A TWO-DIMENSIONAL SENSOR

TECHNICAL FIELD

This invention is generally related to machine-readable symbol readers.

BACKGROUND

In known optoelectronic devices for acquiring machine-readable symbols, such as bar codes, a diaphragm has a circular aperture of small diameter so as to prevent defocusing of an image and/or to increase the depth of field of the device. The small diameter of the aperture, however, reduces the intensity of reflected light received at the sensor and, in practice, makes it necessary to use light sources having a high luminous intensity in order to compensate for the reduction in luminous intensity introduced by the aperture. However, high intensity light sources are expensive and lead to high power consumption.

While increasing the diameter of the aperture of the diaphragm increases the quantity of light received by the sensor, the increase in diameter also reduces the depth of field of the device, thereby reducing the overall efficiency of the device.

One attempt at solving these problems involves producing an optoelectronic device as described in patent application EP-61000, where the diaphragm has an aperture having an asymmetrical elongation along an axis orthogonal to the axis of the bar code, such as an aperture of rectangular, rhombic or elliptical shape. This effectively increases the sensitivity of optoelectronic devices, which is proportional to the ratio of collected flux to reflected flux. As a result, the depth of field of these devices may be increased without significantly affecting the intensity collected on the sensor, thereby increasing the efficiency of these devices. The relatively large dimensions of the diaphragm aperture, however, makes it necessary to use an asymmetrical diaphragm, and optical means for forming the image on the sensor having dimensions greater than those of conventional optical means, which increases production costs and complexity greater than those of conventional diaphragms and optical means.

Another attempt at solving these problems involves producing optoelectronic devices as described in International Patent Applications WO-9620454 and WO-9847377, where the optical means are adapted to obtain, in the plane (XOZ) parallel to the optical plane, a magnification $m_1$ greater than the magnification $m_2$ in the plane (YOZ) perpendicular to the optical plane.

This approach, which can also be associated with that described in the patent EP-61000, leads to an increase, along axes parallel to the bars of the bar codes, in the size of the illumination surface of the bar codes whose image is reflected on the sensor, and therefore to an increase in the sensitivity of the optoelectronic device. It should be noted, furthermore, that since this increase in the sensitivity of the device results from the mere design of the optical means and not from the dimensions of the diaphragm aperture, a device of this type may be equipped with a conventional diaphragm with a circular aperture of small dimensions and therefore with low-cost optical means of conventional dimensions which is easy to produce.

With all these devices in which the diaphragm and/or the optical means do not form a symmetrical system generated by revolution round the optical axis, the improvement in sensitivity is effective only when the optical plane (plane containing the optical axis and the scanning direction) coincides exactly with the nominal direction of reading of the bar code (perpendicular to the code bars and spaces). Now, as the bar code and/or the optoelectronic device in practice have unfixed orientations in space, this condition is rarely fulfilled. Thus, a device of this type is extremely sensitive to alignment errors between the optical plane and the normal direction of reading and is therefore difficult to handle.

More generally, known optoelectronic devices for acquiring machine-readable symbols can be configured for predetermined characteristics of the symbols to be acquired and/or for predetermined positioning relative to the device. However, these optoelectronic devices have inferior performance if the symbol does not have these expected characteristics or if the positioning is not perfect. As a result, they suffer from a significant reading failure rate, in particular in the case of plurimonodimensional symbols such as PDF 417 codes.

U.S. Pat. No. 5,654,533 describes a two-dimensional symbol reader comprising a two-dimensional sensor and an automatic diaphragm of which the diameter varies to allow appropriate illumination of the sensor. This device does not attempt, and cannot solve the above mentioned problem since, with this device, correct illumination of the sensor corresponds to a diaphragm that produces an inadequate depth of field. Furthermore, this device is limited to the acquisition of bi-dimensional symbols by imagery, in other words by obtaining and analyzing two-dimensional images.

WO-98.16896 describes a two-dimensional symbol reader comprising both an electronic scanning device having a two-dimensional sensor and a laser scanner device. This mixed reader enables the user to select one of the two devices depending on the symbol to be read. It is however very complex and therefore expensive, fragile and awkward to use. In particular, the embodiments disclosed herein avoid the use of laser devices incorporating moving parts.

At present, therefore, there is no optoelectronic device for acquiring machine-readable symbols, such as bar codes, with electronic scanning which has satisfactory performance, particularly in depth of field, which allows the acquisition of symbols with any characteristics which may be not be known in advance. For example, bar dimensions, bar contrast, type of codes, monodimensional or plurimonodimensional codes (in other words formed by a plurality of monodimensional bar codes) such as the PDF 417 codes, or two-dimensional codes, etc.

SUMMARY

In one aspect, an optoelectronic device is capable of acquiring bichromatic machine-readable symbols, such as bar codes, formed from monochromatic elements of geometric patterns (e.g., bars, squares, hexagons) having one of two levels of contrasting colors of which the shapes and disposition are adapted so that each code is able to represent bi-uniquely a value of information to be acquired.

In another aspect, a process allows an optoelectronic device to acquire machine-readable symbols based on symbol characteristics. In one aspect, a device and a process acquires machine-readable symbols having different characteristics, in particular of different types, and which may be adapted at the moment of acquisition, in particular automatically, to the characteristics, in particular to the type of symbol to be acquired.

In another aspect, an optoelectronic device and process acquires machine-readable symbols with electronic scanning, while simultaneously providing large depth of field and low rotational sensitivity to alignment errors between the optical plane and the nominal direction of reading of the symbol, without necessitating the use of high intensity light sources.

In yet another aspect, an optoelectronic device does not require a high degree of precision in positioning of the machine-readable symbols to be acquired relative to the device in the relative spacing and rotational alignment around the optical axis, and allow manual acquisition (in other words by relative manual positioning of the device and/or the symbol) of the symbols.

In a further aspect, an optoelectronic device and a process manually acquires (by manual relative positioning of the symbol and/or optoelectronic device) machine-readable symbols from relatively new symbologies such as PDF 417 codes.

In yet a further aspect, an optoelectronic device can provide the above benefits while being inexpensively manufactured in a traditional manner, which requires no moving parts.

In still a further aspect, acquiring symbols can be performed by a simple and quick process, which can be entirely automated.

To this end, a non-limiting, illustrated embodiment of an optoelectronic device for acquiring bichromatic bar codes, comprises:

a reading window,
sensor means with electronic scanning comprising a two-dimensional sensor comprising a plurality of individual detectors known as pixels transmitting electrical signals representing the quantity of light which they receive, the sensor means being adapted to carry out electronic scanning or at least a portion, known as scanned portion, of this two-dimensional sensor in a direction, known as scanning direction XX', the pixels of the two-dimensional sensor being ordered in a plurality of h rows juxtaposed in a direction, known as direction YY', perpendicular to the scanning direction XX', the two-dimensional sensor/extending in the direction YY' over a height greater than a pixel, the scanned portion having a dimension in the direction YY', known as height Hy, which is constant during each scanning operation, from one side to the other of the two-dimensional sensor in the scanning direction XX',
optical means adapted to form, at least on the scanned portion of the two-dimensional sensor, an image of a symbol or code to be acquired located opposite the reading window, wherein, in order to acquire a code placed opposite the reading window, the sensor means are adapted to carry out at least two scanning operations (i.e., passes) and to modify, between at least two successive scanning operations, the height Hy of the scanned portion of the two-dimensional sensor.

Throughout the text, the term "row" denotes each series of successive individual pixels which can be covered pixel by pixel during a scanning operation in the scanning direction. A row is therefore defined by the geometric arrangement of the pixels of the sensor in the scanning direction XX' and by the way in which these pixels considered individually are covered during the scanning operation. In the simplest case of pixels arranged in lines and scanning carried out over each line, a row corresponds to a line. However, if the pixels of two adjacent lines are alternated during the scanning operation, a row is thus formed by the pixels of these two lines. While scanning along a row in the scanning direction XX', electrical signals are received from one or more pixels arranged across the rows with respect to one another in the direction YY', perpendicular to the scanning direction XX'.

Also to this end, a non-limiting, illustrated embodiment of a method of operating an optoelectronic device for acquiring bichromatic symbols, comprises:

a reading window,
sensor means with electronic scanning in a global scanning direction, known as scanning direction XX' comprising a plurality of individual light detectors known as pixels transmitting electrical signals representing the quantity of light which they receive, these sensor means comprising a two-dimensional sensor of which the pixels are ordered in a plurality of h rows juxtaposed in a direction, known as direction YY', perpendicular to the scanning direction XX', this two-dimensional sensor extending perpendicularly to the scanning direction XX' over a height greater than a pixel, the sensor means being adapted to carry out electronic scanning of at least a portion, known as scanned portion, of the two-dimensional sensor having a dimension in the direction YY', known as height Hy, which is constant during each scanning operation, from one side to the other of the two-dimensional sensor in the scanning direction XX',
optical means adapted to form, on the sensor means, an image of a symbol or code to be acquired located opposite the reading window, a process for acquiring bichromatic bar codes, wherein, in order to acquire a symbol or code placed opposite the reading window, at least two scanning operations are carried out and, between at least two successive scanning operations, the height Hy of the scanned portion of the two-dimensional sensor is modified.

In a device and a process according to the invention, the height Hy can be modified once; or several times but not between the scanning operations each time; or between two successive scanning operations each time in order to acquire the same symbol or code.

To modify the height Hy of the scanned portion, it is possible to modify either the height of at least one row of the scanned portion (by selecting a row of which the pixels have a different height pyj) or the number of rows in this scanned portion, in other words the number of successive pixels in the direction YY' of which the signals are added up in a same signal used during the decoding operation. These two variations may be combined. It is in fact possible to modify both the number of rows and the height of at least one row. In fact, the height Hy of the scanned portion is equal to the sum of heights pyj of each row j of this scanned portion. If all the heights pyj of the rows are equal to a same value py and if the scanned portion comprises by rows, the height Hy of this scanned portion is equal to hy×py. If the rows do not all have the same height pyj, $$Hy = \sum_{j=1}^{hy} pyj$$

In a variation, therefore, the device according to the invention is characterized in that each row is formed by pixels all having the same dimension in this row in direction YY', known as height pyj, wherein the pixel height pyj of at least one row of the two-dimensional sensor is different from that of the pixels of at least one other row of the two-dimensional sensor and wherein, in order to modify the height Hy of the scanned portion, the sensor means are adapted to carry out at least one scanning operation, known as first scanning operation, with at least one row of pixels and at least one further scanning operation, known as second scanning operation, with at least one row having a pixel height pyj different from that of at least one row of the first scanning operation. Advantageously and according to the invention, the sensor means are adapted to carry out at least one second scanning operation with at least one row having a pixel height pyj different from that of each row of at least one first scanning operation.

In a further variation of the invention, in order to modify the height Hy of the scanned portion, the sensor means are adapted to modify the number, known as pitch try, of successive rows of the scanned portion.

The scanned portion of the sensor is the one comprising the pixels of which the signals are used to decode a symbol or code on the basis of a scanning operation. By modifying the value of the height Hy or the portion scanned between at least two scanning operations, the device adapts itself or may be adapted to the type and/or to the characteristics (which may be unknown) of the symbol or code to be acquired since at least some of the different values used for the height Hy will be most suitable.

In a first variation of the invention, the various possible values of the height Hy may be predetermined in advance (for example if the variations in height Hy are obtained by selecting rows from a plurality of different heights pyj) and optionally stored (for example various predetermined values for the number hy of rows) in the device comprising electronic processing means adapted subsequently to select the best result obtained by the various scanning operations in order to execute a decoding protocol. In particular, this variation is applicable if the type of symbol is known but not the optical characteristics of the codes to be read (contrast, dimensions, etc.).

In a second preferred variation of the invention, the device automatically adapts itself to the codes to be read of which the type and characteristics may be unknown. Advantageously, the device according to the invention comprising electronic processing means adapted, during each reading of a symbol or code to be acquired:
  to control the scanning operations by the sensor in the scanning direction XX' and receive the electrical signals issuing from the pixels,
  to execute a predetermined decoding protocol in order to obtain the value of information represented by the symbol or code, wherein the sensor means are adapted to, after each scanning operation, execute treatment to optimize the height Hy in order to improve the results of the subsequent scanning stage and reduce the number of scanning stages required for decoding, wherein, during this optimization treatment, an optimized value of the height Hy which is to be used during a subsequent scanning operation is determined as a function:
  of at least one previously measured value of at least one parameter representing the quality of the image acquired by the sensor means,
  and/or of at least one item of information issuing from a previously executed decoding stage, and wherein the sensor means are adapted to record the optimized value of the height Hy determined in this way to be used during a subsequent scanning operation.

In a device and a process according to this second variation of the invention, the value of the height Hy, in particular the pitch hy and/or the selection of the row(s) of height pyj used, is therefore optimized after each scanning operation to improve the results of the subsequent scanning stage thus enabling the decoding process to be executed and accelerated and enabling the number of scanning stages required for decoding to be reduced, with a field depth, electricity consumption and rotational sensitivity round the optical axis which are compatible with practical use of the device, and with an electronic scanning device which is free from moving parts.

In particular in the case of simple bar codes or bar codes of the PDF 417 type, the electronic processing means determine, after each scanning operation, the value of the height Hy optimized to obtain the best field depth with given rotational sensitivity.

Advantageously and according to the invention, the optimized value of the height Hy is determined by computation, by closed loop control on the basis of a reference value of a parameter or by optimization control by comparing the evolution of at least one parameter of a reading operation to another. Advantageously, therefore, automatic control is incorporated in the electronic processing means.

Advantageously and according to the invention, the optimized value of the height Hy is determined as a function of at least one previously measured value, in particular after the previously effected last stage of scanning, of at least one parameter representing the quality of the image acquired by the sensor means selected from the maximum spatial frequency fx of the symbol in the scanning direction XX', the maximum intensity of at least one category of symbol image elements, the minimum intensity of at least one category of symbol image elements and the contrast of at least one category of symbol image elements. Further similar parameters may be used as an alternative or in combination.

Advantageously and according to the invention, the optimized value of the height Hy is determined as a function of at least one item of information relating to the type of symbol to be acquired and issuing from a previously executed decoding stage.

Advantageously and according to the invention, each previously measured value and/or each item of information used to determine said optimized value(s) has been obtained and recorded during a scanning operation immediately preceding said optimization treatment.

Advantageously and according to the invention, the electronic processing means are adapted to fix by default and to record an initial value Hy° of the height Hy before a first scanning operation in order to acquire a code and/or after a last scanning operation in order to acquire a symbol or code, in particular a value hy° of the pitch hy. For example, hy°–h/2 may be selected in which h is the total number of rows corresponding to the total height H of the sensor in direction YY'.

Advantageously and according to the invention, the electronic processing means are adapted to, after each scanning operation:
  determine the measured value of the maximum spatial frequency fx of the symbol image in the scanning direction XX',
  calculate and record the optimized value of the height Hy on the basis of an affine function of the inverse of the measured value of the maximum spatial frequency fx of the code image in the scanning direction XX'.

Advantageously and according to the invention, moreover, the electronic processing means are adapted to determine the optimized value of the height Hy according to functions parameterized by predefined values, in particular predefined by the user or during manufacture and stored in a read-only memory of the device, of parametric coefficients linked to the type(s) of symbols to be acquired.

Advantageously and according to the invention, the electronic processing means are adapted to determine, after at least one scanning operation, in particular after a first scanning operation in order to acquire a symbol or after each scanning operation, the corresponding type of symbol and the value of the corresponding parametric coefficients. For example, if a number of gray levels higher than 2 is detected with a characteristic homogeneous spatial frequency, it is probable that the symbol is of the PDF 417 symbology type and therefore comprises a plurality of bar fines and that Hy was greater than the height of the image of a line of bars of the symbol. It is thus possible to impose subsequent criteria on the height Hy, in particular on the pitch try, in particular that Hy is smaller than 4 times the width of the image of the finest element of the symbol, this being a necessary condition for acquiring PDF 417 symbols.

Advantageously and according to the invention, the electronic processing means are adapted to calculate the optimized value of the height Hy according to a function parameterized by a predefined value of the maximum permitted angular deviation θmax of the sensor round the optical axis ZZ' relative to the symbol to be acquired.

In an advantageous variation of the invention, the electronic processing means are adapted to determine and, if necessary, modify the optimized value of the height Hy in order to optimize the measured value of the contrast of at least one category of symbol image elements. To this end, the electronic processing means may include closed loop control adapted to optimize the contrast.

In a further variation of the invention, the optimized value of the height Hy is determined by computation.

Advantageously and according to the invention, the two-dimensional sensor is a surface sensor formed by a CCD or APS matrix of pixels. This sensor can have a plurality of embodiments.

In a first embodiment, the pixels in the same row are juxtaposed and are aligned in the scanning direction XX', the sensor being formed by a pixel matrix having h lines. In other words, each row of pixels is formed by one of the lines of the sensor. The pixels are generally square or rectangular.

In further embodiments, the electronic processing means and the sensor are adapted so that the pixels in the same row belong to two distinct lines of sensor pixels which are adjacent to one another in direction YY', parallel to the scanning direction XX', the successive pixels in each row, when covering a row in the pixel-by-pixel scanning direction, alternately belonging to either of these two lines. This variation enable the dimension of the sensor in the scanning direction text to be reduced with the same resolution. The pixels may be square or rectangular, or may have other, generally polygonal, shapes.

Furthermore, the height ply of the pixels in each row may be the same (py) in all rows or, on the contrary, different from one row to another.

Advantageously and according to the invention, moreover, the optical means comprise a diaphragm of which the dimensions are approximately the minimum dimensions corresponding to the theoretical limit of diffraction and are always greater than these minimum dimensions. Owing to the invention, the smallest diaphragm allowed by the theoretical limit of diffraction may in fact be adopted. Advantageously and according to the invention, therefore, the dimension $1i$ of the diaphragm in the direction II' selected from the scanning direction XX' or the direction YY' is roughly but greater than:

$$k\lambda f(I+mi)/pi \cdot Nmini$$

wherein

λ is the wavelength of the lighting means, f is the focal length of the optical means, mi is the magnification of the optical means in the direction II', pi is the dimension of the pixels of the sensor means in the direction II', Nmini is the minimum number of successive pixels the direction II' which have to be contained in the image of a code element on the sensor to allow the decoding thereof, k is a form factor of the diaphragm.

Advantageously and according to the invention, an optimization treatment characterized by at least one of the characteristics described above in relation to the device according to the invention is executed.

It should be noted that U.S. Pat. No. 5,319,182 describes a mixed sensor which mixes light-emitting elements and light-sensitive elements which can be used in a bar code reader comprising a matrix of emitting and receiving diodes, and aims to provide axial lighting for the target aligned with the field of vision on the target to avoid the effects of diffusion and of layers. This document mentions configuration and optimization of the grouping and proportion of emitters and detectors in the matrix according to the image processing application thereof, in particular for the reading of bar code symbols. However, this document does not describe an electronic scanning device capable of adapting itself to the unknown characteristics of a symbol to be read and in which the number of pixels in the direction perpendicular to the scanning direction is modified between two successive scanning operations.

The invention also relates to a device and a process which are characterized in combination by all or some of the characteristics mentioned hereinbefore or hereinafter.

Further objects, characteristics and advantages of the invention will emerge on reading the following description which refers to the accompanying figures describing various non-limiting embodiments of the invention.

BRIEF DESCRIPTION OF DRAWINGS

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes of elements, as drawn are not intended to convey any information regarding the actual shape of the particular elements, and have been solely selected for their ease and recognition in the drawings.

FIG. 1 is a perspective view illustrating the geometry of a device according to the invention.

FIG. 2 is a schematic diagram illustrating an electronic processing circuit of an optoelectronic device according to the invention.

DETAILED DESCRIPTION

Figure 3:
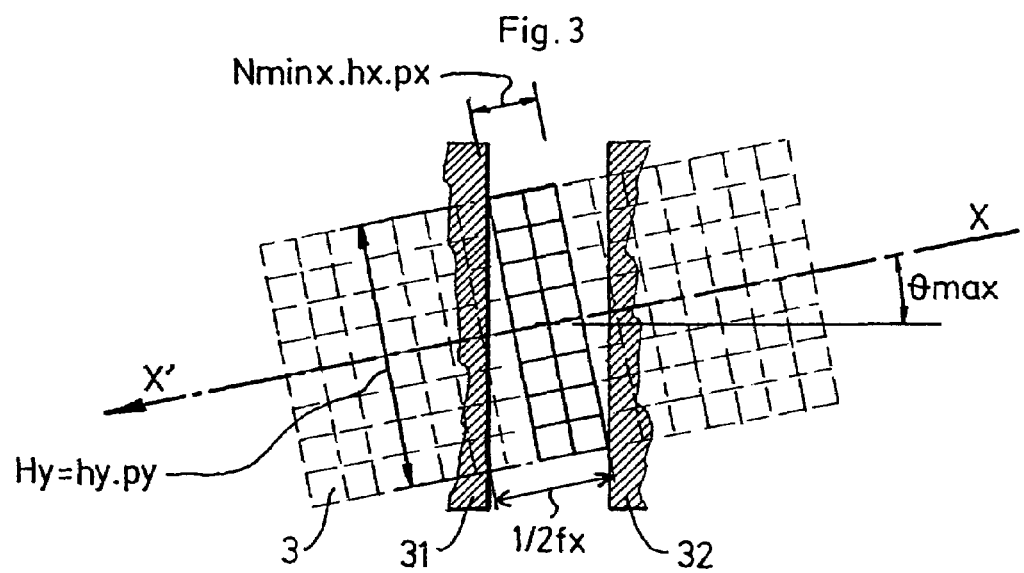
FIG. 3 is a basic diagram in the image plane for determining a formula for computation of the optimized value of the pitch hy in the case of bar codes.

In the following description, certain specific details are set forth in order to provide a thorough understanding of various embodiments of the invention. However, one skilled in the art will understand that the invention may be practiced without these details. In other instances, well-known structures associated with machine-readable symbol readers, decoders, imaging devices, optics, computers, computer networks, data structures, databases and networks, have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

FIG. 1 shows an optoelectronic device 34 according to the invention. The general characteristics of optoelectronic devices and their production are well known. Therefore, only the novel characteristics of the optoelectronic device will be described in detail.

This optoelectronic device 34 generally comprises a framework 35 defining a reading Window 7 in front of which the symbols to be acquired such as bar code symbol 1 are presented. The teachings apply to any bichromatic symbol such as bar codes, area codes, matrix or stacked codes formed by elements of monochromatic geometric patterns having one of two contrasting levels of color, of which the shapes and arrangement are adapted so that each symbol can biuniquely represent a value of information to be acquired. The example in FIG. 1 is a traditional monodimensional bar code.

The framework 35 of the optoelectronic device 34 contains an optical assembly 2, a sensor 3, and light source 4. The light source 4 can, for example, take the form of an LED strip and its associated optics, for illuminating the bar code symbol 1. The bar code symbol 1 to be acquired is placed opposite the reading window 7. The optoelectronic device 34 may be of the portable type intended to be moved by a user in front of a symbol to be acquired. Alternatively, the optoelectronic device 34 may be of the stationary type, the symbol itself being moved manually or otherwise in front of the reading window of the device.

The optical assembly 2 includes a diaphragm 5 and a set of one or more lenses 6 forming an optical system having an optical axis ZZ' adapted to form an image of the bar code 1 symbol to be acquired on the sensor 3.

The sensor 3 takes the form of a two-dimensional sensor which is at least substantially centered on the optical axis ZZ' of the optical assembly 2. The sensor 3 includes a plurality of individual lighting detectors known as pixels. The pixels transmit electrical signals representing the quantity of light which they receive. The sensor 3 is of the electronic scanning type. In other words, the sensor's 3 pixels are read successively, individually or in groups, one after the other in a global scanning direction, known as scanning direction XX', perpendicular to the optical axis ZZ'. The sensor 3 is formed by a matrix of pixels ordered in a plurality of h rows, h being an integer greater than 1, juxtaposed in the direction YY' perpendicular to the scanning direction XX' and to the optical axis ZZ'. The scanning direction XX' corresponds to a direction of alignment or at least, to the global direction of arrangement (median direction in the case of pixels covered in a zig-zag manner) of the pixels of the sensor 3. A sensor 3 of this type is well known as such. Each line of pixels is connected to an output, and the pixels are read successively by offsetting according to the frequency of a clock signal controlling the sensor 3.

In the embodiment shown in FIGS. 1 and 2, the sensor 3 is a simple matrix of pixels ordered in straight lines and in straight columns. The pixels in a same row are therefore juxtaposed and are aligned in the scanning direction XX' corresponding to the direction of the lines of the sensor 3 thus formed by a matrix of pixels having h lines of pixels all of the same size in the direction YY', known as height py.

Figure 6:
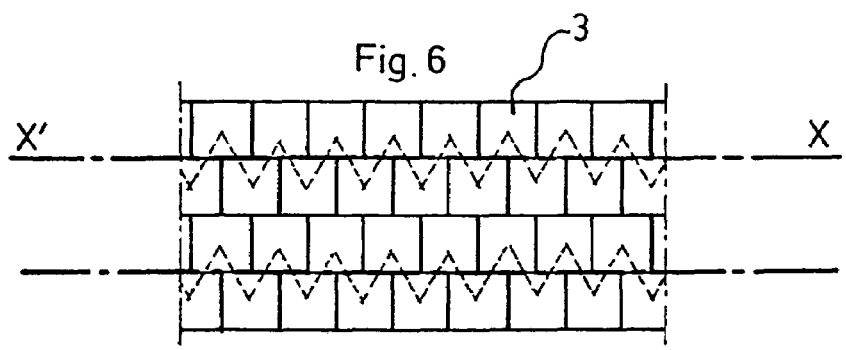
FIGS. 6 and 7 are diagrams illustrating two variations of a sensor of a device according to the invention.
Figure 7:
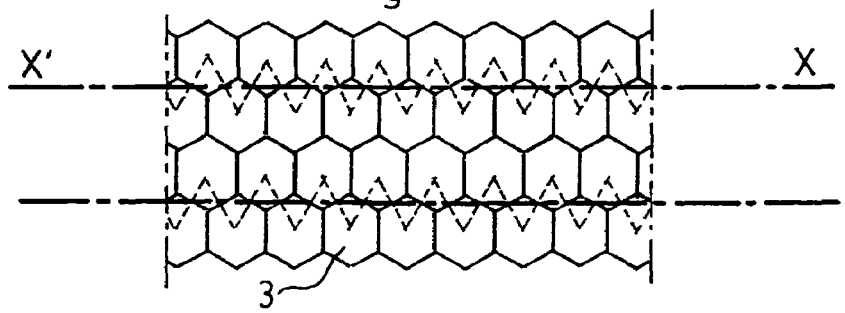

FIG. 6 shows an embodiment in which the pixels in the lines which are adjacent in direction YY' are longitudinally offset, each row of the sensor 3 being formed by two adjacent lines of which the pixels may be covered alternately from one line to another in a zig-zag manner. The value of such scanning is to reduce the dimension of the sensor 3 in the scanning direction XX' while maintaining the same resolution. The drawback, however, is to increase the overall dimension of the sensor 3, in the direction The embodiment shown in FIG. 7 is similar to that in FIG. 6, apart from the fact that the pixels are not square but hexagonal. Further similar variations are obviously possible.

Figure 12:
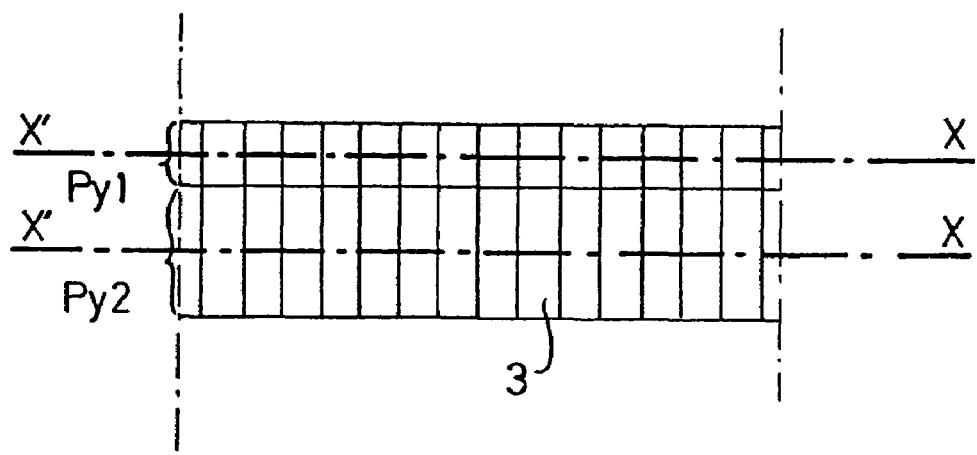
FIG. 12 is a diagram illustrating a further variation of a sensor of a device according to the invention.

In the embodiment shown in FIG. 12, the sensor 3 comprises at least two adjacent lines of pixels having different pixel heights pyj. Namely one line of pixels of small height py1 and one line of pixels of large height py2. In the simplest embodiment, the sensor 3 comprises only two lines. However, there is nothing to prevent multiplication of the lines of different heights. It should be noted in this respect that the height of the bar code symbol image on the sensor 3 is much greater than the height of the individual lines of the sensor 3, and is also greater than the total height H of the sensor 3.

FIG. 2 shows an electronic processing circuit 36 of the optoelectronic device 34. All the pixels in each row of the sensor 3 are connected in series to one of the output pins 8 of the sensor 3 which therefore comprises h output pins 8. The output pins 8 are connected via a set of switches 9 to the input of an adding circuit 10. The adding circuit 10 transmits a signal at an output 11 to an acquisition circuit 12 that records the various values obtained at the output 11 over time, in other words during the scanning operation. The acquisition circuit 12 transmits an intensity signal to a decoding logic circuit 13. The decoding logic circuit 13 supplies a trigger signal to a control logic circuit 14, equipped with one or more microprocessors which controls the operation of the sensor 3. In particular, the logic circuit 14 controls a register 15 associated with the switches 9 such that the values of the register 15 control the opening or closing of each of the switches 9 placed between each output pin 8 of the sensor 3 and each corresponding input of the adder 10.

It is shown schematically in FIG. 2 that, when a bit of the register 15 is set to zero, the corresponding switch 9 is open whereas when this bit is set to 1, the corresponding switch 9 is closed. In the example shown in FIG. 2, the sensor 3 comprises eight rows and only the third row, the fourth row and the fifth row (numbered from the bottom) are connected to the adding circuit 10. At each moment, the signals issuing from these three rows are therefore added at the output 11. During each scanning operation, the hy rows of the sensor 3 which are active, in other words selected to form a portion, known as the scanned portion 16 of the sensor 3, are scanned simultaneously in parallel by means of the supply circuit 7.

The electronic processing circuit 36 groups the pixels in groups of adjacent pixels, known as individual read elements, during each scanning operation. Each group of pixels has the same number of pixels, which is greater than or equal to 1. The signals from all the pixels in the group are added, and the resulting signal used for decoding the bar code symbol. The various individual read elements extending successively in the scanning direction XX' while defining a selection of row(s) forming the scanned portion 16, scanned by the scanning operation and having a dimension in the YY' direction, known as height Hy, which is the same for all the individual read elements forming the portion scanned by a same scanning operation. Each individual read element comprises, in each row of the scanned portion 16, the same number hx of adjacent pixels in the scanning direction XX' and comprises a number hy of adjacent rows, in other words pixels, in the direction YY'.

In a first embodiment, the electronic processing circuit 36 is adapted, during each scanning operation, to activate an individual read element at each moment and to cover the two-dimensional sensor 3 with successive individual read elements all having the same number of pixels defining the selection of row(s) of the two-dimensional sensor 3 forming said scanned portion 16, the individual read elements having a dimension, known as height Hy, in the direction YY' which remains constant during the same scanning operation. Alternatively, the pixels may be grouped not electronically but logically on the basis of the signals received from each pixel individually.

During a scanning operation, each of the pixels of each of the rows is read according to the frequency transmitted by the control logic circuit 14. The decoding logic circuit 13 is therefore adapted and programmed to combine and add the successive pixels in the scanning direction XX' according to a pitch hx which, in the example illustrated, is equal to 2. Thus, the pixels of the sensor 3 are grouped in successively read individual read elements extending in the direction YY' according to a pitch hy, that is a height Hy=hy×py, and in the scanning direction XX', according to a pitch hx, that is a width Hx=hx×px, px being the width of each pixel (dimension in the scanning direction XX').

In the variation illustrated, the hy rows are combined in the direction YY' by adding the analogue signals, whereas the hx pixels are combined logically by programming the decoding logic circuit 13. Further variations are possible. For example, the hx pixels may be grouped by reading according to an appropriate frequency with addition of the analogue signals of the successively read pixels. It is also possible to scan all the lines but to select and group the hy rows logically by programming the programmable logic circuit 13.

In the case of the sensors 3 as illustrated in FIGS. 6 and 7, the control logic circuit 14 is able to control, during each clock pulse, a change in the value of the register 15 in order to read the adjacent lines of a row alternately.

Alternatively in all cases, all the pixels of all the lines may be read individually or successively and the programmable logic circuit 13 may be programmed so as to group the hx×hy pixels and to add their signals to obtain the individual read elements corresponding to the scanned portion 16.

In FIG. 2, the active useful area is indicated by hatching, this area corresponding to the scanned portion 16 of the sensor 3 which allows collection of the luminous intensity issuing from the optical means 2 and used for reading the bar code symbol, during the subsequent decoding operation. It should be noted that, here again, the scanned portion 16 may be defined electronically, the sensor means receiving the signals originating solely from this scanned portion or, alternatively, by logic means, the sensor 3 being read in its entirety but only the signals issuing from the pixels of the scanned portion 16 then being exploited. At any moment, the scanned portion 16 of the sensor 3 corresponds to a rectangle having hy rows in height and hx pixels in width corresponding to an individual read element. All the electrical signals issuing from the pixels of this individual read element are added at the output 11, so, the greater the number of pixels of this individual read element hx and hy, the greater the signal obtained with the same luminous intensity received on the sensor 3.

According to the invention, the microprocessor equipped control logic means 14 incorporate a logic processing program allowing the value of the height Hy of the scanned portion 16 to be optimized, in particular the value of the pitch hy of this scanned portion 16.

Figure 4:
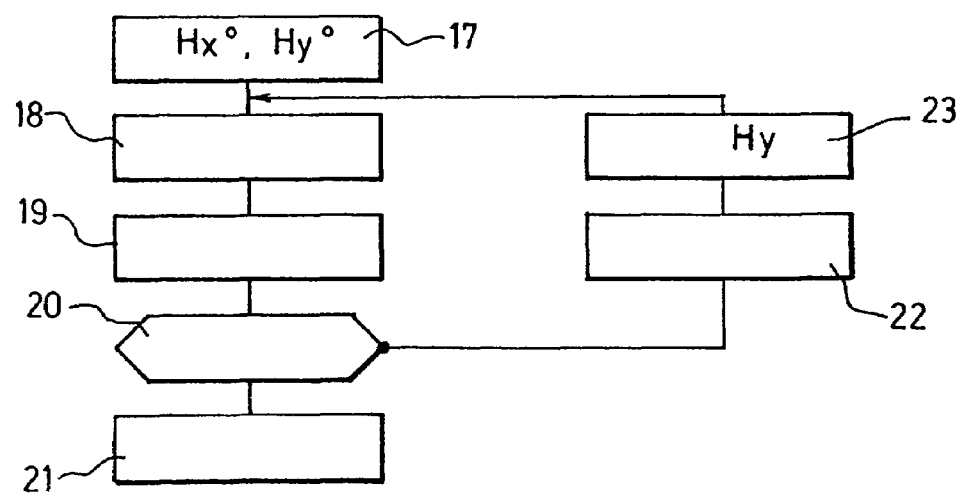
FIG. 4 is a flow chart of a first variation of a process according to the invention.

FIG. 4 shows a first variation of a process according to the invention employed in a device according to the invention to allow automatic determination of the optimized value of the height Hy, in particular of the pitch hy, in order to optimize the field depth of the device according to the invention. During stage 17, the values of the height Hy and of the width Hx of the individual read elements, in particular the values of the pitches hx and hy, are initialized to predetermined initial values Hy° and Hx°, in particular hy° and hy°. In practice, these initial values are of little importance in so far as the process according to the invention is converging very quickly. For examples, hy° and hx° may be fixed at 1. Alternatively, hy°=h/2 (or ENT (h/2) if h is odd) and hx°=1 may be selected, if monodimensional bar codes are to be acquired a priori. In the case of PDF 417 type bar codes, hy°=1 and hx°=1 may be selected. Whatever the type of code to be acquired, the process according to the invention will allow decoding to be effected more or less rapidly depending on the initial value hy° implemented. In the variation in FIG. 12, at least one of the rows is selected, in other words at least one of the heights pyj.

It should be noted, however, that in view of the current clocking rates of the microprocessors which may be used in the control logic means 14, the scanning and decoding rate is extremely fast and, in any case, much faster than the relative displacement of the bar code symbol 1 with respect to the sensor 3, which may be induced by the movements of a human operator.

The subsequent stage 18 corresponds to scanning for the purpose of reading of the bar code symbol 1, in other words for carrying out complete scanning of the sensor 3, with the previously recorded and selected value of the height Hy, in particular of the pitch hy and/or of the height pyj of the row(s), of the scanned portion 16, the light source 4 being active. The subsequent stage 19 corresponds to the execution of the decoding protocol. This decoding protocol is well known as such and consists, on the one hand, in determining the type of machine-readable symbol to be acquired, then, depending on the type of symbol to be determined, the values of information represented by the symbol. During the subsequent stage 20, it is determined whether or not the decoding process 19 has ended with the total decoding of the bar code symbol 1. If so, the process is terminated during the final stage 21, then returns to the start of the initialization stage 17 in order to acquire a new bar code symbol 1.

If the stage 20 determines that decoding has not ended, logic processing is executed in stage 22 to determine whether or not the height Hy, in particular the pitch hy and/or the selection of the row(s), of the scanned portion 16 should be modified. A new optimized value of this height Hy is determined and recorded during a subsequent modification stage 23. After determining the new optimize value, a return is made to the beginning of stage 18 in order to carry out a new scanning operation and a new reading of the bar code symbol 1 to be acquired. In this variation, therefore, the decoding process 19 is carried out after each stage of scanning 18. During the logic processing stage 22, at least one measured value of at least one parameter representing the quality of the image acquired by the sensor 3 during the scanning stage 18 or during an earlier scanning stage 18, or one or more items of information issuing from an earlier decoding stage 19, or both at least one such measured value and at least one such item of information can therefore be taken into consideration.

The parameters representing the quality of the image acquired by the sensor 3 which may be selected include, in particular, the maximum spatial frequency fx of the symbol image in the scanning direction XX' and/or the maximum intensity Imax of the symbol image and/or the minimum intensity Imin of the symbol image and/or the contrast of at least one category of elements of the symbol image or of the contrast values of the various elements of the symbol image. The contrast of a symbol or of a category of elements of a symbol (for example all the bars of the same width) may be represented by the value (Imax−Imin)/(Imax+Imin) obtained for the entire symbol image or for a category of elements of the symbol image. Other contrast formula may be used.

The optimized value of the height Hy, in particular of the pitch hy and/or of the height(s) pyj, may be calculated and determined on the basis of the measured value of at least one of these parameters during the reading stage 18. For example, if it is known that the symbols to be acquired are monodimensional bar codes with one line, a predetermined formula may be used. Advantageously and according to the invention, therefore, the electronic processing circuit 36 is adapted to calculate the optimized value of the pitch hy in the direction YY' for a symbol of the monodimensional bar code type having a line corresponding to the formula (I):

$$hy = ENT\left[(1/(py \cdot \tan(\theta max))) \cdot [(1/(2 \cdot fx)) - (Nminx \cdot hx \cdot px)]\right] \quad (I)$$

wherein, θmax is the maximum permitted angular deviation round the optical axis of the sensor means relative to the symbol to be acquired, px is the dimension of the pixels in the scanning direction xx', fx is the maximum spatial frequency of a previously read image of the symbol in the scanning direction XX', py is the dimension of the pixels in direction YY', Nminx is the minimum number of groups of successive pixels in the scanning direction XX' which have to be contained in the image of a symbol element on the sensor to allow the de coding thereof, ENT is the total part function, and wherein $hx = ENT\left[1/(2fx \cdot Nminx \cdot px)\right]$.

This formula (I) is obtained with the construction in FIG. 3 which shows, in the image plane, a portion of the sensor 3 and two bars 31, 32 of the bar code symbol 1 separated by the smallest distance (corresponding to the maximum spatial frequency of the symbol). In this diagram, it has been assumed that hx=1, Nminx=2 and hy=8.

Similarly, if it is known that the symbols to be acquired are PDF 417 type codes (pluri-monodimensional bar code symbols having a plurality of lines juxtaposed in the vertical direction), a predetermined formula may be used. Advantageously and according to the invention, therefore, the electronic processing circuit 36 is adapted to calculate the optimized value of the pitch hy in direction YY' for a bar code symbol of the type known as PPF 417 corresponding to formula (II):

$$hy = ENT\left\{MIN\left[(Ky/(2fx \cdot py)), [(1/py \cdot \tan(\theta max))) \cdot [1/(2 \cdot fx)) - (Nminx \cdot hx \cdot px)]\right]\right\} \quad (II)$$

wherein, Omax is the maximum permitted angular deviation round the optical axis of the sensor means relative to the symbol to be acquired, px is the dimension of the pixels in the scanning direction XX', fx is the maximum spatial frequency of a previously read image of the symbol in the scanning direction XX', py is the dimension of the pixels in direction YY', Nminx is the minimum number of groups of successive pixels in the scanning direction XX' which have to be contained in the image of a symbol element on the sensor to allow the decoding thereof, ENT is the total part function, Ky is an integer determined to allow decoding of the PDF 417 bar code symbols, MIN is the minimum function, and wherein $hx = ENT\left[1/(2fx \cdot Nminex \cdot px)\right]$.

Figure 9:
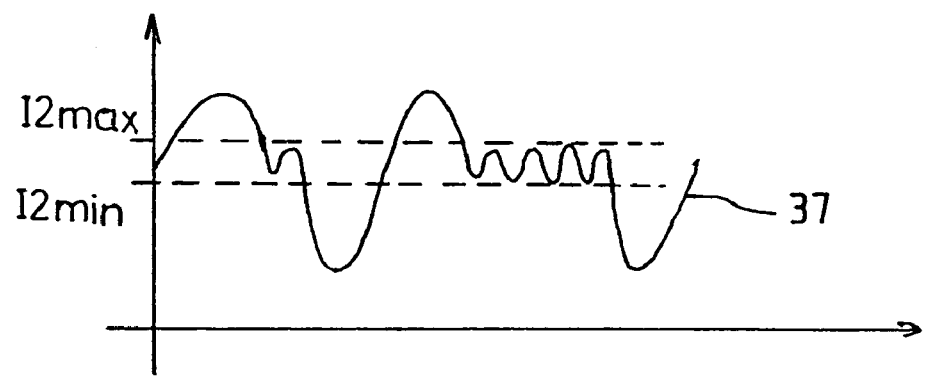
FIG. 9 is a graph showing an example of intensity signal after the reading of the code following that in FIG. 8.

More generally, however, the invention allows the value of Hy to be optimized without even knowing a priori the type of symbol to be acquired. The type of symbol may be sought during the stage 22 of logic processing by the electronic processing circuit 36 after the first reading 18 of a symbol to be acquired. For example, if the output signal obtained has, as shown in FIG. 9, a number of levels of distinct intensity greater than 2 with a characteristic homogeneous spatial frequency, it is certain that a plurality of different elements of the symbol are covered by the pitch hy in direction YY'. Consequently, the symbol cannot be formed by a monodimensional bar code. A PDF 417 type symbol, in particular, is therefore involved. Now with this type of symbol there is a condition whereby Hy≦Ky·mx, Ixmin, namely≦Ky·mx·Ixmin/py.

This condition may therefore be taken into consideration when determining the new value of Hy, in particular of py. Even more generally, the value of Hy can be optimized without even knowing and determining the type of symbol to be acquired.

Figure 8:
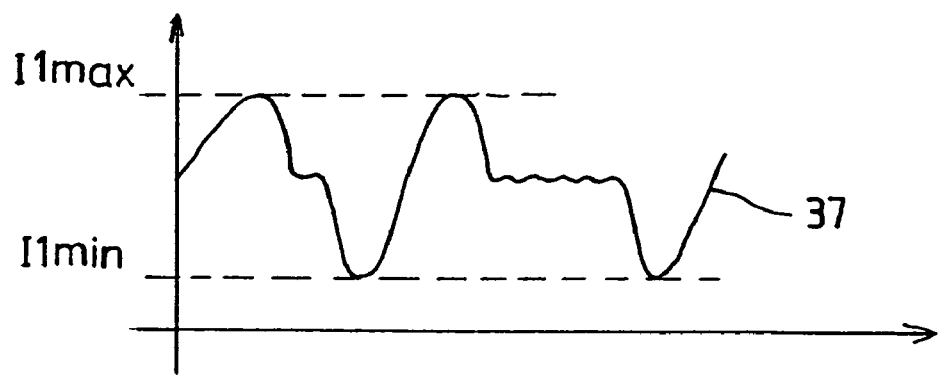
FIG. 8 is a graph showing an example of intensity signal obtained after the reading of a code.

FIG. 8 shows an example of intensity signal 37 which may be obtained at the output 11 of the adder 10 after a first scanning 18 of a bar code symbol having bars of two widths. This signal 37 enables the bars of greater width to be detected between their maximum intensities IImax and minimum intensities IImin, but attenuates the bars of small width. This attenuation may be due either to defocusing of the image or to an excessive value of Hy. After such a signal 37, Hy may therefore be reduced, for example by a unit, to carry out a new scanning operation. If it is found that the signal has not improved after this new scanning operation, in other words that the bars of smaller width are not detected, the problem originates from defocusing which has to be treated by a different solution. On the other hand, if the problem originates from the value of Hy, the signal 37 will be improved as shown in FIG. 9, where the bars of smaller width appear with their maximum intensity I2max and minimum intensity I2min. This modification of Hy can therefore be pursued, if the signal to noise ratio is sufficient, until decoding is achieved.

Figure 10:
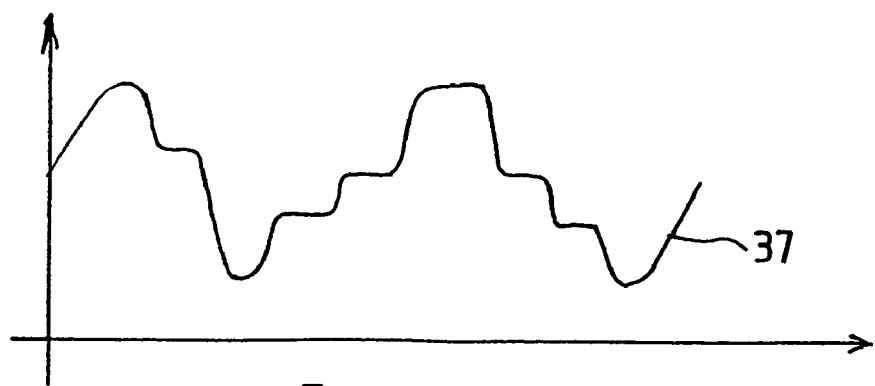
FIG. 10 is a graph showing a further example of an intensity signal obtained after the reading of a code.
Figure 11:
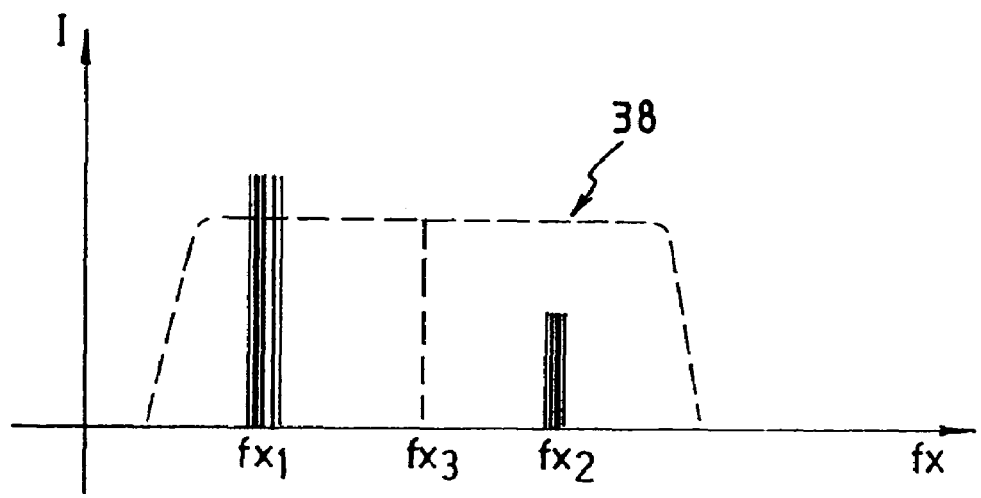
FIG. 11 shows an example of an intensity signal spectrum obtained in the case of a bar code having bars of two widths.

FIGS. 10 and 11 show a further example of information on the type of symbol which may be obtained after the reading stage 18. If the contrast is sufficient, in a monodimensional bar code symbol 1, which may have bars of two different widths, the signal spectrum obtained is normally classified by two values $fx_1$ and $fx_2$ of the spatial frequency in the direction XX'. If the presence of these two values is effectively noted, it is known that the symbol to be acquired is of the type having bars of two distinct widths, and a preferential value for Hy can therefore be deduced therefrom. For example, the aforementioned formula (I) can then be applied in order to determine hy for a monodimensional bar code symbol.

Dotted lines 38 (FIG. 11), illustrate the trend of the spectrum in the case where the contrast is not sufficient to discriminate between the two frequencies $fx_1$ and $fx_2$. In this case, it may nevertheless be considered that the maximum spatial frequency fx of the code image in the scanning direction XX' has a median value $fx_3$ which may be used in calculating the pitch hy.

Figure 5:
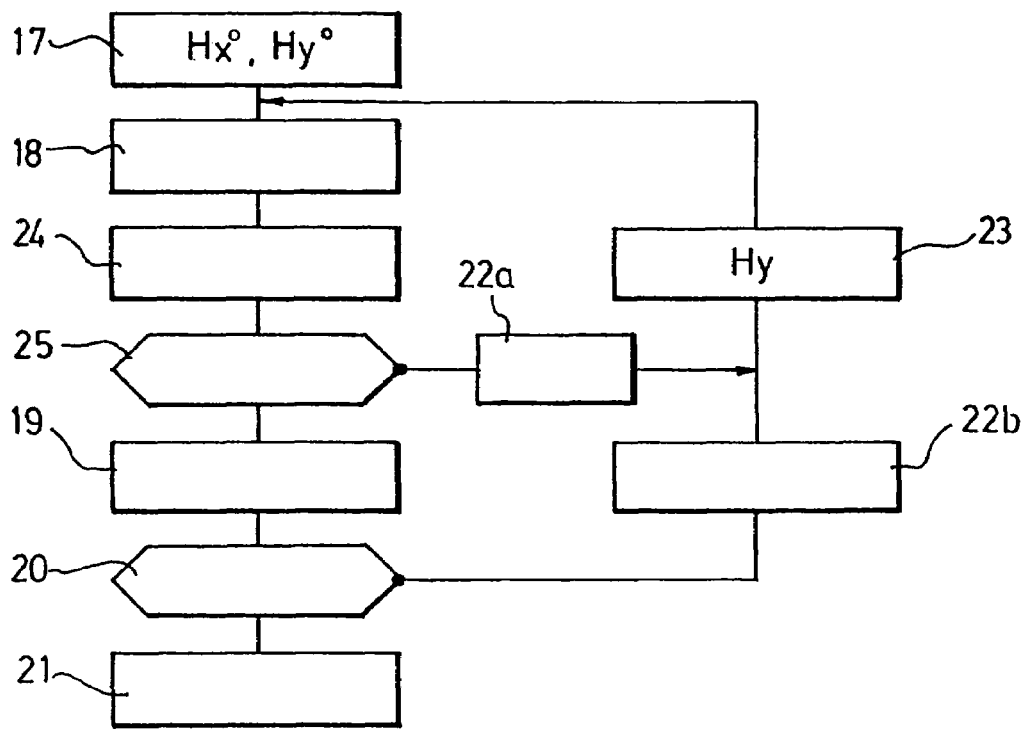
FIG. 5 is A flow chart of a second variation of a process according to the invention.

FIG. 5 shows a variation of the process in which a treatment for determining and modifying the height Hy, in particular the pitch hy and/or the height(s) pyj of the selected row, according to the measured value of at least one parameter relating to the quality of the previously obtained image, is carried out independently of a treatment employing at least one item of information issuing from the decoding stage 19. In this variation, the decoding process is not in fact carried out after each scanning operation. This variation therefore also comprises an initialization stage 17, a scanning stage 18 for reading a symbol to be acquired, immediately followed by a stage 24 for measuring at least one parameter representing the quality of the image as mentioned hereinbefore. During the subsequent stage 25, it is determined whether or not the criteria relating to each of these parameters are satisfied. In other words, it is determined whether or not the image quality is satisfactory for carrying out a decoding stage. From among these criteria, for example, it may be required that the contrast of at least one category of elements of the symbol image (for example the bars of small width) is greater than a predetermined value, or that the maximum spatial frequency fx of the symbol image in the direction XX', is within a predetermined maximum type deviation. If these criteria are not satisfied, the decoding stage 19 is not carried out. Instead, a logic processing stage 22a is carried out which determines (by computation or optimization) whether or not the value of the height Hy has to be modified. The process then loops, executing the stage 23 of modification, recording the new optimized value of Hy, and returning to a new scanning stage 18. Thus, successive scanning stages are carried out and the value Hy is modified if the quality of the image is not adequate, in the sense of the criteria predetermined during stage 25.

If the image quality is considered sufficient during stage 25, the decoding stage 19 is carried out. Stage 20 follows, which determines whether or not decoding has been successful. If decoding has been successful, the process is ended during stage 21. If not, a logic processing stage 22b is carried out, which determines, on the basis of the information coming from the decoding stage 19, whether the value of the height Hy should be modified. The new value Hy is recorded, if applicable, during the modification stage 23, and the process reiterates, executing a new reading operation 18.

To calculate the optimized value of the height Hy of the scanned portion 16, an optimized value of the pitch hy (number of rows) can be calculated and/or, in the variation in FIG. 12, the selection of adjacent row(s) having a total height closest to the optimum value can be determined, for example by selecting the row having the most appropriate height pyj.

The process according to the invention may be carried out by programming on the basis of the above-described logic functions.

The invention may form the subject of numerous variations. In particular, numerous distinct optimization treatments may be employed depending, in particular, on the types of symbols to be acquired. More generally, all the known digital optimization processes and digital or even analog automatic controls are applicable (proportional regulator, derivative, integral, PID, etc.).

Furthermore, instead of optimization of Hy, it may be sufficient to store various predetermined values of Hy or to calculate these predetermined values according to a formula independent of the symbol type (which depends only on a serial number of the scanning stage to be carried out). Then all the various possible scanning operations are carried out, each with one of these values. In the variation in FIG. 12, the various scanning operations may even be carried out with each of the rows or with each possible selection of row(s). The decoding protocol is carried out after each scanning operation or after all scanning operations. If the decoding protocol is carried out after each scanning operation, the successive scanning/decoding operations may be continued at least until the machine-readable symbol is recognized, by modifying Hy between two successive scanning operations. If the decoding protocol is carried out after all the scanning operations, the results obtained during the scanning operations can be sorted by quality (for example by contrast and/or intensity) and decoding can be commenced with the best results.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other systems for reading machine-readable symbols, not necessarily the bar code symbol reading system generally described above. The various embodiments described above can be combined to provide further embodiments. The illustrated methods can omit some acts, can add other acts, and can execute the acts in a different other than that illustrated to achieve the advantages of the invention. The teachings of the applications, patents and publications referred to herein, are incorporated by reference in their entirety.

These and other changes can be made to the invention in light of the above detailed description. In general, in the following claims, the terms used should not be construed to limit the invention to the specific embodiments disclosed in the specification, but should be construed to include all imaging systems that operate in accordance with the claims. Accordingly, the invention is not limited by the disclosure, but instead its scope is to be determined entirely by the following claims.

The invention claimed is:

1. An optoelectronic device for acquiring machine-readable symbols, comprising:
   a sensor array comprising a plurality of light sensing elements, the light sensing elements producing a signal representative a quantity of light incident on the respective light sensing element; and
   a scanning control circuit coupled to selectively sample the respective signals from the light sensing elements of the sensor array and operable to change a resolution of the sensor array in a direction perpendicular to a scanning direction, between at least a first resolution during at least a first sampling pass and a second resolution during at least a second sampling pass, the second sampling pass following the first sampling pass,
   wherein the sensor array is a two-dimensional array of light sensing elements arranged in a plurality of rows, the light sensing elements in each of the rows extending in the scanning direction, and the plurality of rows arranged in the direction perpendicular to the scanning direction with respect to one another, the light sensing elements in a first one of the rows having a first height measured in the direction perpendicular to the scanning direction, and the light sensing elements in a second one of the rows having a second height measured in the direction perpendicular to the scanning direction, the second height different from the first height.

2. The optoelectronic device of claim 1 wherein the scanning control circuit selectively samples the signals from the light sensing elements in the first row during the first pass and selectively samples the signals from the light sensing elements in the second row during the second pass.

3. An optoelectronic device for acquiring machine-readable symbols, comprising:
   a sensor array comprising a plurality of light sensing elements, the light sensing elements producing a signal representative a quantity of light incident on the respective light sensing element; and
   a scanning control circuit coupled to selectively sample the respective signals from the light sensing elements of the sensor array and operable to change a resolution of the sensor array in a direction perpendicular to a scanning direction, between at least a first resolution during at Least a first sampling pass and a second resolution during at least a second sampling pass, the second sampling pass following the first sampling pass,
   wherein the scanning control circuit during the first pass selectively samples signals from the light sensing elements in a first pair of rows having a first cumulative height in the direction perpendicular to the scanning direction, and during the second pass selectively samples signals from the light sensing elements in a second pair of rows having a second cumulative height in the direction perpendicular to the scanning direction, different than the first cumulative height.

4. An optoelectronic device for acquiring machine-readable symbols, comprising:
   a sensor array comprising a plurality of light sensing elements, the light sensing elements producing a signal representative a quantity of light incident on the respective light sensing element; and
   a scanning control circuit coupled to selectively sample the respective signals from the light sensing elements of the sensor array and operable to change a resolution of the sensor array in a direction perpendicular to a scanning direction, between at least a first resolution during at least a first sampling pass and a second resolution during at least a second sampling pass, the second sampling pass following the first sampling pass,
   wherein the scanning control circuit during the first pass selectively samples signals from the light sensing elements in a first number of rows having a cumulative first height in the direction perpendicular to the scanning direction, and during the second pass selectively samples signals from the light sensing elements in a second number of rows having a cumulative second height in the direction perpendicular to the scanning direction, the cumulative second height different than the cumulative first height.

5. An optoelectronic device for acquiring machine-readable symbols, comprising:
   a sensor array comprising a plurality of light sensing elements, the light sensing elements producing a signal representative a quantity of light incident on the respective light sensing element; and
   a scanning control circuit coupled to selectively sample the respective signals from the light sensing elements of the sensor array and operable to change a resolution of the sensor array in a direction perpendicular to a scanning direction, between at least a first resolution during at least a first sampling pass and a second resolution during at least a second sampling pass, the second sampling pass following the first sampling pass,
   wherein the sensor array is a two-dimensional array of light sensing elements arranged in a plurality of rows, the light sensing elements in each of the rows extending in the scanning direction, and the plurality of rows arranged in the direction perpendicular to the scanning direction with respect to one another, the light sensing elements in adjacent rows being offset from one another in the scanning direction.

6. The optoelectronic device of claim 5 wherein the light sensing elements are sampled in order generally along the scanning direction and alternating between immediately adjacent ones of the rows.

7. A method of operating an optoelectronic device to acquire machine-readable symbols, the optoelectronic device including a sensor array comprising a plurality of light sensing elements, each of light sensing elements producing a signal representative of a quantity of light incident on the respective light sensing element, the method comprising:
   receiving signals from a first set of the light sensing elements at a first resolution during a first sampling pass across the sensor array while an image of a first machine-readable symbol is formed on the sensor array; and
   receiving signals from a second set of light sensing elements at a second resolution during a second sampling pass across the sensor array while the image of the first machine-readable symbol is formed on the sensor array, the second resolution different from the first resolution in a direction perpendicular to the first and second sampling passes, wherein the sensor array is a two-dimensional array of light sensing elements arranged in a plurality of rows, the light sensing elements in each of the rows extending in a scanning direction, and the plurality of rows arranged in a direction perpendicular to the scanning direction with respect to one another, the light sensing elements in a first one of the rows having a first height measured in the direction perpendicular to the scanning direction, and the light sensing element in a second one of the rows having a second height measured in the direction perpendicular to the scanning direction, the second height different from the first height, and wherein receiving signals from a first set of the light sensing elements at a first resolution during a first sampling pass comprises selectively sampling the signals from the light sensing elements in the first row during the first pass and wherein receiving signals from a second set of light sensing elements at a second resolution during a second sampling pass comprises selectively sampling the signals from the light sensing elements in the second row during the second pass.

8. A method of operating an optoelectronic device to acquire machine-readable symbols, the optoelectronic device including a sensor array comprising a plurality of light sensing elements, each of light sensing elements producing a signal representative of a quantity of light incident on the respective light sensing element, the method comprising:

receiving signals from a first set of the light sensing elements at a first resolution during a first sampling pass across the sensor array while an image of a first machine-readable symbol is formed on the sensor array; and receiving signals from a second set of light sensing elements at a second resolution during a second sampling pass across the sensor array while the image of the first machine-readable symbol is formed on the sensor array, the second resolution different from the first resolution in a direction perpendicular to the first and second sampling passes, wherein receiving signals from a first set of the light sensing elements at a first resolution during a first sampling pass comprises selectively sampling signals from the light sensing elements in a first pair of rows having a first cumulative height in a direction perpendicular to a scanning direction, and wherein receiving signals from a second set of light sensing elements at a second resolution during a second sampling pass comprises selectively sampling signals from the light sensing elements in a second pair of rows having a second cumulative height in the direction perpendicular to the scanning direction, the second cumulative height different than the first cumulative height.

9. A method of operating an optoelectronic device to acquire machine-readable symbols, the optoelectronic device including a sensor array comprising a plurality of light sensing elements, each of light sensing elements producing a signal representative of a quantity of light incident on the respective light sensing element, the method comprising:

receiving signals from a first set of the light sensing elements at a first resolution during a first sampling pass across the sensor array while an image of a first machine-readable symbol is formed on the sensor array; and receiving signals from a second set of light sensing elements at a second resolution during a second sampling pass across the sensor array while the image of the first machine-readable symbol is formed on the sensor array, the second resolution different from the first resolution in a direction perpendicular to the first and second sampling passes, wherein receiving signals from a first set of the light sensing elements at a first resolution during a first sampling pass comprises selectively sampling signals from the light sensing elements in a first number of rows having a first cumulative height in a direction perpendicular to a scanning direction, and wherein receiving signals from a second set of light sensing elements at a second resolution during a second sampling pass comprises selectively sampling signals from the light sensing elements in a second number of rows having a second cumulative height in the direction perpendicular to the scanning direction, the second cumulative height different than the first cumulative height.

10. A method of operating an optoelectronic device to acquire machine-readable symbols, the optoelectronic device including a sensor array comprising a plurality of light sensing elements, each of light sensing elements producing a signal representative of a quantity of light incident on the respective light sensing element, the method comprising:

receiving signals from a first set of the light sensing elements at a first resolution during a first sampling pass across the sensor array while an image of a first machine-readable symbol is formed on the sensor array; and receiving signals from a second set of light sensing elements at a second resolution during a second sampling pass across the sensor array while the image of the first machine-readable symbol is formed on the sensor array, the second resolution different from the first resolution in a direction perpendicular to the first and second sampling passes, wherein the sensor array is a two-dimensional array of light sensing elements arranged in a plurality of rows, the light sensing elements in each of the rows extending in a scanning direction, and the plurality of rows arranged in a direction perpendicular to the scanning direction with respect to one another, the light sensing elements in adjacent rows being offset from one another in the scanning direction, and wherein the light sensing elements are sampled in order generally along a scanning direction, alternating between immediately adjacent rows of the sensor array.

11. A method of operating an optoelectronic device to acquire machine-readable symbols, the optoelectronic device including a sensor array comprising a plurality of light sensing elements, each of light sensing elements producing a signal representative of a quantity of light incident on the respective light sensing element, the method comprising:

receiving signals from a first set of the light sensing elements at a first resolution during a first sampling pass across the sensor array while an image of a first machine-readable symbol is formed on the sensor array;

receiving signals from a second set of light sensing elements at a second resolution during a second sampling pass across the sensor array while the image of the first machine-readable symbol is formed on the sensor array, the second resolution different from the first resolution in a direction perpendicular to the first and second sampling passes; and determining a new height for a set of the light sensing elements after each sampling pass based on at least one previously measured value of at least one parameter representing a quality of an image of a symbol acquired by the optoelectronic device, the quality selected from: a maximum spatial frequency of the image in a scanning direction, a maximum intensity of at least one category of symbol element in the image, a minimum intensity of at least one category of symbol element in the image, and a contrast of at least one category of symbol element in the image.

* * * * *